(12) United States Patent
Sargent (10) Patent No.: US 7,762,408 B2
(45) Date of Patent: Jul. 27, 2010

(54) EQUIPMENT RACK

(75) Inventor: David D. Sargent, Riviera Beach, FL (US)

(73) Assignee: Green Touch Industries, Inc., Lake Park, FL (US)

( * ) Notice: Subject to any disclaimer, the term of this patent is extended or adjusted under 35 U.S.C. 154(b) by 596 days.

(21) Appl. No.: 11/538,407

(22) Filed: Oct. 3, 2006

(65) Prior Publication Data

US 2008/0078727 A1    Apr. 3, 2008

(51) Int. Cl.
*A47F 7/00* (2006.01)
(52) U.S. Cl. .................................................. 211/85.7
(58) Field of Classification Search ............... 211/85.7, 211/4, 85.1, 70.6, 60.1, 13.1, 49.1; 224/402, 224/403, 406; 248/297.21
See application file for complete search history.

(56) References Cited

U.S. PATENT DOCUMENTS

| | | | | |
|---|---|---|---|---|
| 763,461 | A * | 6/1904 | Burton | 211/8 |
| 1,291,430 | A * | 1/1919 | Davenport | 211/8 |
| 3,326,385 | A * | 6/1967 | Pinkerton et al. | 211/4 |
| 3,767,093 | A * | 10/1973 | Pinkerton et al. | 224/569 |
| 4,450,989 | A * | 5/1984 | Bogar, Jr. | 224/549 |
| 4,596,334 | A * | 6/1986 | Daulton | 211/64 |
| 4,696,405 | A * | 9/1987 | Waring | 211/4 |
| 4,776,471 | A * | 10/1988 | Elkins | 211/64 |
| 4,805,781 | A * | 2/1989 | Tegel | 211/85.1 |
| 5,524,772 | A * | 6/1996 | Simmons | 211/4 |
| 5,647,489 | A * | 7/1997 | Bellis, Jr. | 211/70.6 |
| 5,964,358 | A * | 10/1999 | Hafendorfer et al. | 211/70.6 |
| 6,073,781 | A * | 6/2000 | Puglisi | 211/70.6 |
| 6,173,842 | B1 * | 1/2001 | Fitzgerald | 211/4 |
| 6,182,840 | B1 * | 2/2001 | Tegel | 211/85.1 |
| 6,302,280 | B1 * | 10/2001 | Bermes | 211/70.6 |
| 6,409,029 | B1 * | 6/2002 | Bermes | 211/70.6 |
| 6,619,485 | B1 * | 9/2003 | Jenkins | 211/4 |
| 2007/0090069 | A1 * | 4/2007 | Hafendorfer et al. | 211/60.1 |
| 2008/0078727 | A1 * | 4/2008 | Sargent | 211/4 |

OTHER PUBLICATIONS www.trimmertrap.com/racks/tt2.htm (posted at least as of Aug. 20, 2007).
www.rackemmfg.com/open.shtml (posted at least as of Aug. 20, 2007).
www.junglejimsap.com/trailerracks.html (posted at least as of Aug. 20, 2007).

* cited by examiner

*Primary Examiner*—Sarah Purol
(74) *Attorney, Agent, or Firm*—Paul, Hastings, Janofsky & Walker LLP (57) ABSTRACT

An equipment rack system, in accordance with one embodiment, comprising an outer rack support tube; a first receiving member coupled to the outer support tube; an inner locking tube positioned within the outer support tube, the inner locking tube including a first tube latching member; and a first equipment shaft block adapted to fit with the first receiving member, the first equipment shaft block including a latching slot that engages with the first tube latching member when the inner locking tube is in a locked position.

7 Claims, 9 Drawing Sheets

EQUIPMENT RACK

BACKGROUND OF THE INVENTION

1. Field of the Invention

The present invention relates to equipment racks. More specifically, the present invention relates to lockable equipment racks.

2. Discussion of the Related Art

Equipment racks such as trimmer racks are used to help transport and store landscaping equipment. Trimmer racks are generally mounted on an open trailer or on the wall of an enclosed trailer and used to store lawn trimmers and to transport the trimmers from one job site to another during the day. Other types of equipment such as, for example, a blower, can also be stored on equipment racks. However, blowers many times require a more specialized rack.

Equipment racks available currently have a number of problems. First, the racks vibrate when the trailer is being driven down the road. This causes the equipment (e.g., trimmers) to rotate while in the rack leading to fuel spills and/or the engines of the trimmers being flooded. The vibration is caused because the trimmers do not fit tightly into the rack. One additional problem is the equipment stored in the racks is very susceptible to theft. While most racks include the ability to lock the trimmers to the rack, the locks and/or locking system are usually easily circumvented using bolt cutters or a hack saw. The locks used with trimmer racks are generally completely exposed and can be cut off in seconds using bolt cutters and the trimmer can subsequently easily be removed. In general, while the trimmer racks may be a deterrent to some thieves, anyone who is familiar with trimmer racks and brings the proper equipment can fairly easily steal equipment from existing racks.

Thus, an improved equipment rack is needed that solves one or more of the above problems.

SUMMARY OF THE INVENTION

Various embodiments described herein address on or more of the problems described above. Other advantages of the embodiments described herein will also be understood from the detailed description of the drawing below.

One embodiment can be characterized as an equipment rack system comprising an outer rack support tube; a first receiving member coupled to the outer support tube; an inner locking tube positioned within the outer support tube, the inner locking tube including a first tube latching member; and a first equipment shaft block adapted to fit with the first receiving member, the first equipment shaft block including a latching slot that engages with the first tube latching member when the inner locking tube is in a locked position. Optionally, the equipment rack shaft system further includes, in accordance with one embodiment, a second receiving member coupled to the outer support tube; a second tube latching member of the inner locking tube; a second equipment shaft block adapted to fit with the second receiving member, the second equipment shaft block including a latching slot that engages with the second tube latching member when the inner locking tube is in a locked position; a lock housing coupled to the outer support tube; a lock substantially positioned within the lock housing when the lock is in a locked position; a lock handle, coupled to the lock and partially positioned within the lock housing; a second rack shaft; and a support mechanism coupled to the second rack shaft.

Another embodiment can be characterized as a locking apparatus comprising an lock shielding housing; a lock substantially positioned within the lock shielding housing, the lock including a loop portion and a body portion; and a lock handle at least partially positioned with the lock shielding housing, the lock handle keeping the loop portion of the lock aligned with a locking hole of the body portion of the lock when in an unlocked position. Optionally, in accordance with one embodiment, the lock shielding housing is coupled to an equipment rack.

A subsequent embodiment includes an equipment rack system comprising a first equipment shaft block adapted to attach to a first shaft; a rack support structure including a locking mechanism; and a first locking receiving member coupled to the rack support structure, the first locking receiving member adapted to receive the first equipment shaft block such that the locking mechanism can engage the first equipment shaft block. In accordance with an optional embodiment, the rack support structure further comprises an outer rack support tube; an inner locking tube positioned within the outer support tube, the inner locking tube including a first tube latching member, wherein the first tube latching member engages with a locking slot in the first equipment shaft block when the inner locking tube is in a locked position; a second equipment shaft block adapted to attach to a second shaft; a second locking receiving member coupled to the rack support structure, wherein the inner locking tube further includes a second tube latching member that engages with a locking slot in the second equipment shaft block when the inner locking tube is in the locked position. The optional embodiment can further include a second rack shaft; and a support mechanism coupled to the second rack shaft. In a subsequent optional embodiment the equipment shaft rack further comprises a second equipment shaft block adapted to attach to a second shaft; and a second locking receiving member coupled to the rack support structure, the second locking receiving member adapted to receive the second equipment shaft block such that the locking mechanism can engage the second equipment shaft block.

Yet another embodiment can be characterized as an equipment rack locking system comprising a support tube; a lock shielding housing coupled to the support tube; and a lock positioned within the lock shielding housing such that only a front face of the lock is exposed outside of the lock shielding housing.

BRIEF DESCRIPTION OF THE DRAWINGS

The above and other aspects, features and advantages of the present invention will be more apparent from the following more particular description thereof, presented in conjunction with the following drawings, wherein.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION OF THE DRAWINGS

The following description is not to be taken in a limiting sense, but is made merely for the purpose of describing the general principles of the invention. The scope of the invention should be determined with reference to the claims. The present embodiments address the problems described in the background while also addressing other additional problems as will be seen from the following detailed description.

Figure 1:
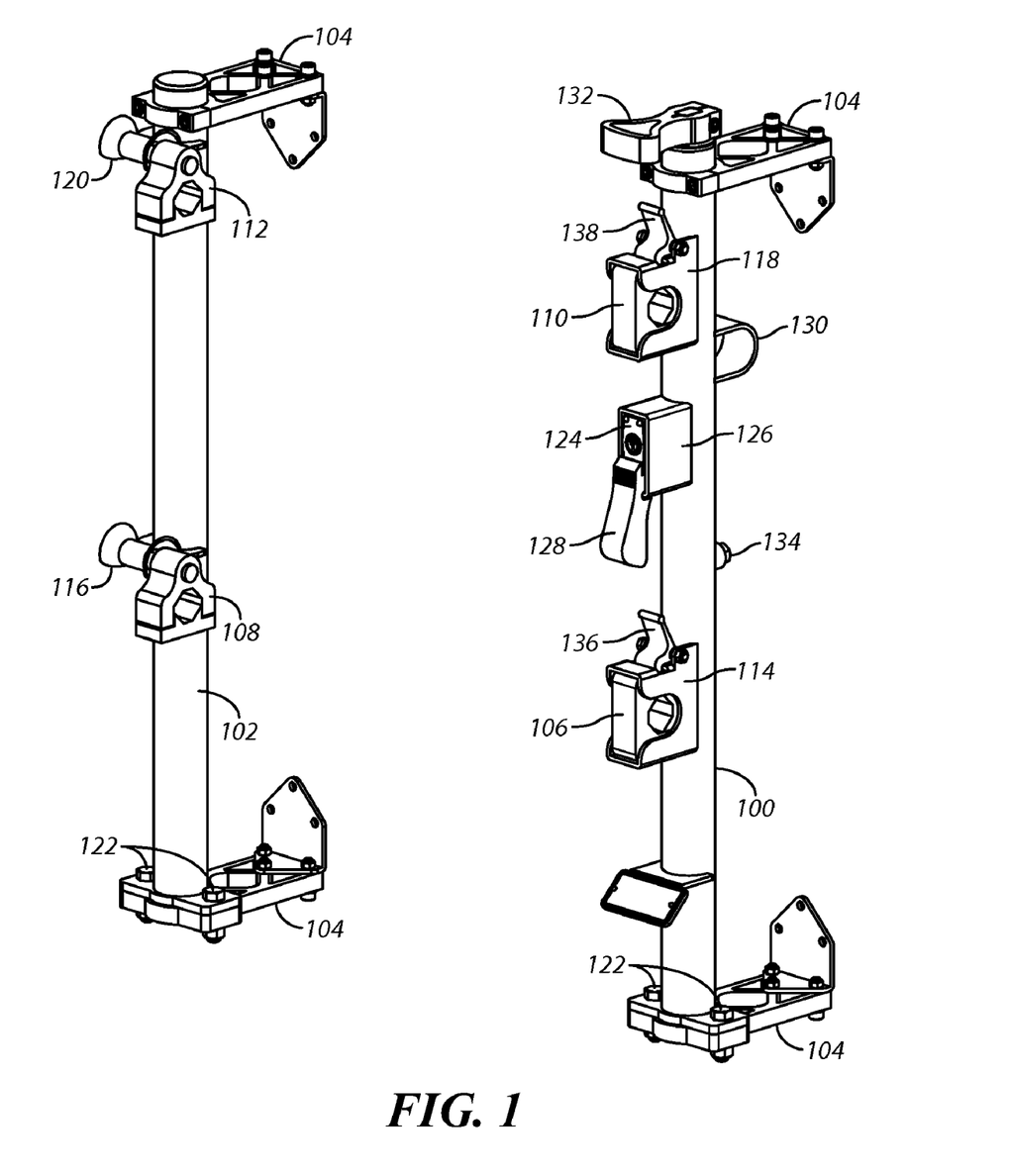
FIG. 1 is a three-dimensional diagram illustrating a two position equipment rack in accordance with one embodiment.

Referring to FIG. 1, a three-dimensional diagram is shown illustrating a two position equipment rack in accordance with one embodiment. Shown is a first rack shaft 100, a second rack shaft 102, a plurality of trailer brackets 104, a first equipment block 106, a second equipment block 108, a third equipment block 110, a fourth equipment block 112, a first locking receiving member 114 for the first equipment block, a first funnel receiving member 116 for the second equipment block, a second locking receiving member 118 for the third equipment block, a second funnel receiving member 120 for the fourth equipment block, a plurality of securing bolts 122, a lock 124, a lock housing 126, a lock handle 128, a cable securing loop 130, a locking grip 132, a stop bolt 134, a first quick release lever 136 and a second quick release lever 138.

The equipment rack can be mounted anywhere it is desirable to store or transport various types of equipment such as trimmers or other landscaping equipment. For example, the equipment rack can be mounted in an open trailer using the plurality of securing bolts 122. In this instance, the plurality of trailer brackets 104 do not need to be utilized. The equipment rack can also be mounted to the wall of an enclosed trailer using the plurality of trailer brackets 104. The securing bolts 122 and the plurality of trailer brackets 104 provide a lot of flexibility for mounting the equipment racks in various different ways depending upon where the equipment rack is being utilized.

The cable securing loop 130 is coupled to the first rack shaft 100. The cable securing loop 130 is used in combination with a thick cable or chain and is used in addition to the plurality of securing bolts 122 to further secure the equipment rack to a trailer or other mounting device. This feature is used as a further theft deterrent and prevents the entire equipment rack from being stolen by simply removing the plurality of securing bolts 122. Advantageously, in accordance with the illustrated embodiment, the cable securing loop 130 is formed from a wide flat piece of sheet metal. This prevents the cable securing loop 130 from being cut using, for example, bolt cutters. In another embodiment, the cable securing loop 130 is made from a round piece of metal, however, as described, this may not be the most secure way of implementing the cable securing loop 130.

Figure 3:
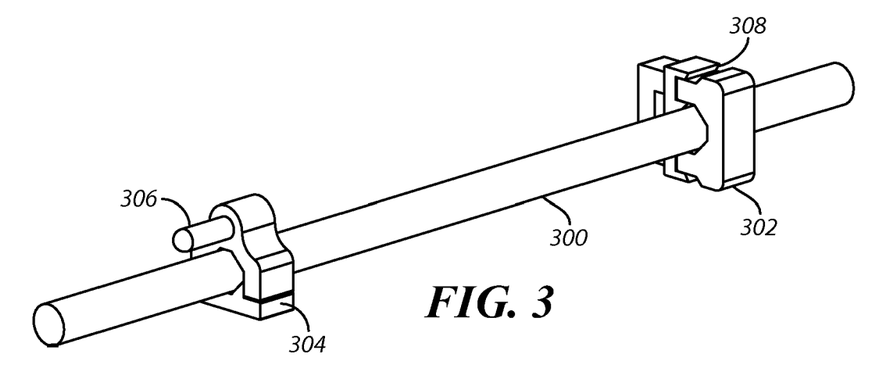
FIG. 3 is a three-dimensional diagram illustrating a trimmer shaft coupled to two equipment shaft blocks in accordance with one embodiment.
Figure 4:
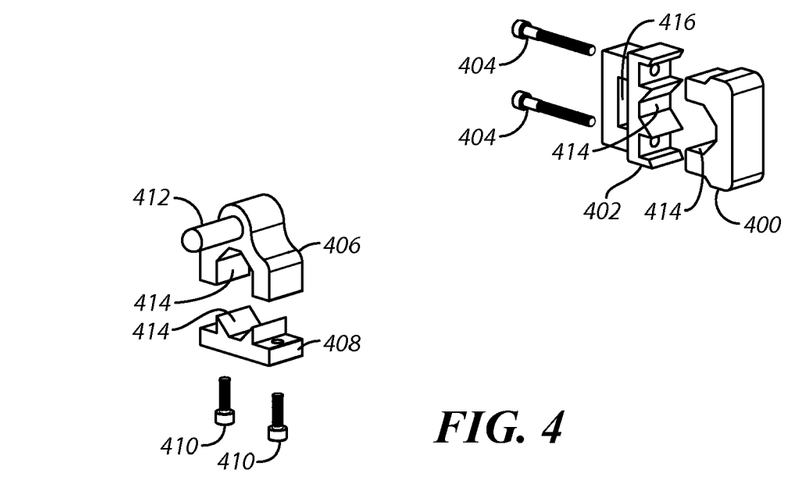
FIG. 4 is a three-dimensional diagram illustrating the two equipment shaft blocks of FIG. 3 having been disassembled in accordance with one embodiment.
Figure 5:
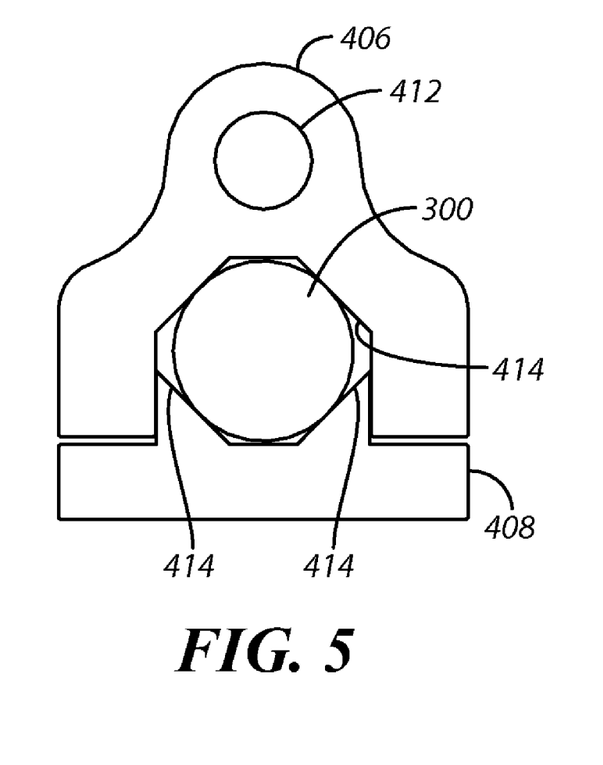
FIG. 5 is a side cross-section view of the trimmer shaft and equipment shaft block shown in FIG. 3.

The first equipment block 106, the second equipment block 108, the third equipment block 110, and the fourth equipment block 112 are used to hold pieces of equipment such as, for example, a trimmer, a line trimmer, a stick edger, and an extended reach hedge trimmer. As is shown in FIGS. 3-5 and described below in greater detail, the first equipment block 106, the second equipment block 108, the third equipment block 110, and the fourth equipment block 112 (also referred to herein collectively as the equipment blocks) attach to a shaft of the equipment (e.g., a shaft of a trimmer). Once the equipment blocks are attached to the shaft of the equipment, the equipment blocks will stay securely attached to the equipment for as long as the piece of equipment is still being used with the equipment rack. When not attached to the equipment rack, the equipment blocks can be swapped between different pieces of equipment. The equipment blocks then attach to the first rack shaft 100 and the second rack shaft 102 and hold the equipment securely in place when being stored or transported. The first equipment block 106 and the third equipment block 110 attach to the first locking receiving member 114 and the second locking receiving member 118, respectively. As will be described in further detail below with reference to FIGS. 8 and 9, the equipment rack will be in the unlocked position when the first equipment block 106 and the third equipment block 110 are engaged or disengaged with the first locking receiving member 114 and the second locking receiving member 118.

When the equipment rack is in the locked position, the first equipment block 106 and the third equipment block 110 can not be removed from the first locking receiving member 114 and the second locking receiving member 118. When in the unlocked position, in order to remove the first equipment block 106 or the third equipment block 110, the first quick release lever 136 or the second quick release lever 138 are pushed toward the first shaft. The first quick release lever 136 and the second quick release lever 138 keep the first equipment block 106 and the third equipment block 110 from accidentally disengaging from the equipment rack when the equipment rack is in the unlocked position. A user can then easily remove the first equipment block 106, and thus the equipment, by engaging the first quick release lever 136 and sliding the first equipment block 106 out from the first locking receiving member 114. The second equipment block 108 is then removed from of the first funnel receiving member 116 and the equipment is ready for use.

The equipment rack is shown in a locked position in FIG. 1. In order to unlock the equipment rack, a user will unlock the lock 124. The lock 124 is positioned substantially within the lock housing 126 (also referred to herein as the lock shielding housing 126) in order to deter thieves from cutting the lock with bolt cutters or otherwise tampering with the lock 124. A detailed description of the locking and unlocking operation of the device will be described below with reference to FIGS. 8 and 9, however, a brief description of the operation will be now be described in order to give an overview of the operation of the equipment rack. After unlocking the lock 124, the user will then pull on the lock handle 128. Once the lock handle 128 and lock 124 are pulled outward (shown in FIG. 9), the locking grip 132 can be rotated in a clockwise direction. This rotates an inner tube (shown in FIGS. 8 and 9) that disengages from the first equipment block 106 and the third equipment block 110, and thus allows the first equipment block 106 and the third equipment block 110 to be removed by engaging the quick release levers. Advantageously, in the embodiment shown, other than a front side of the lock 124, there are not any exposed parts of the locking mechanism. This provides a substantial theft deterrent to potential thieves. Previous equipment racks are generally only protected by an exposed lock which can be removed in seconds with a bolt cutter.

Advantageously, in one embodiment, the equipment rack is almost entirely made from galvanized metal. This includes the outside exposed portions of the equipment rack shown in FIG. 1 and also, for example, the inner locking tube shown in FIG. 8. This helps to prevent wear and rusting as the equipment rack is often used in outdoor conditions where rusting can be a problem. Previous racks often powder coat the equipment racks. The powder coating is easily dinged and scratched which leads to early corrosion of the rack. Alternatively, the equipment rack is made from other types of steel, metal, or other alloys as suited for a particular implementation.

Figure 2:
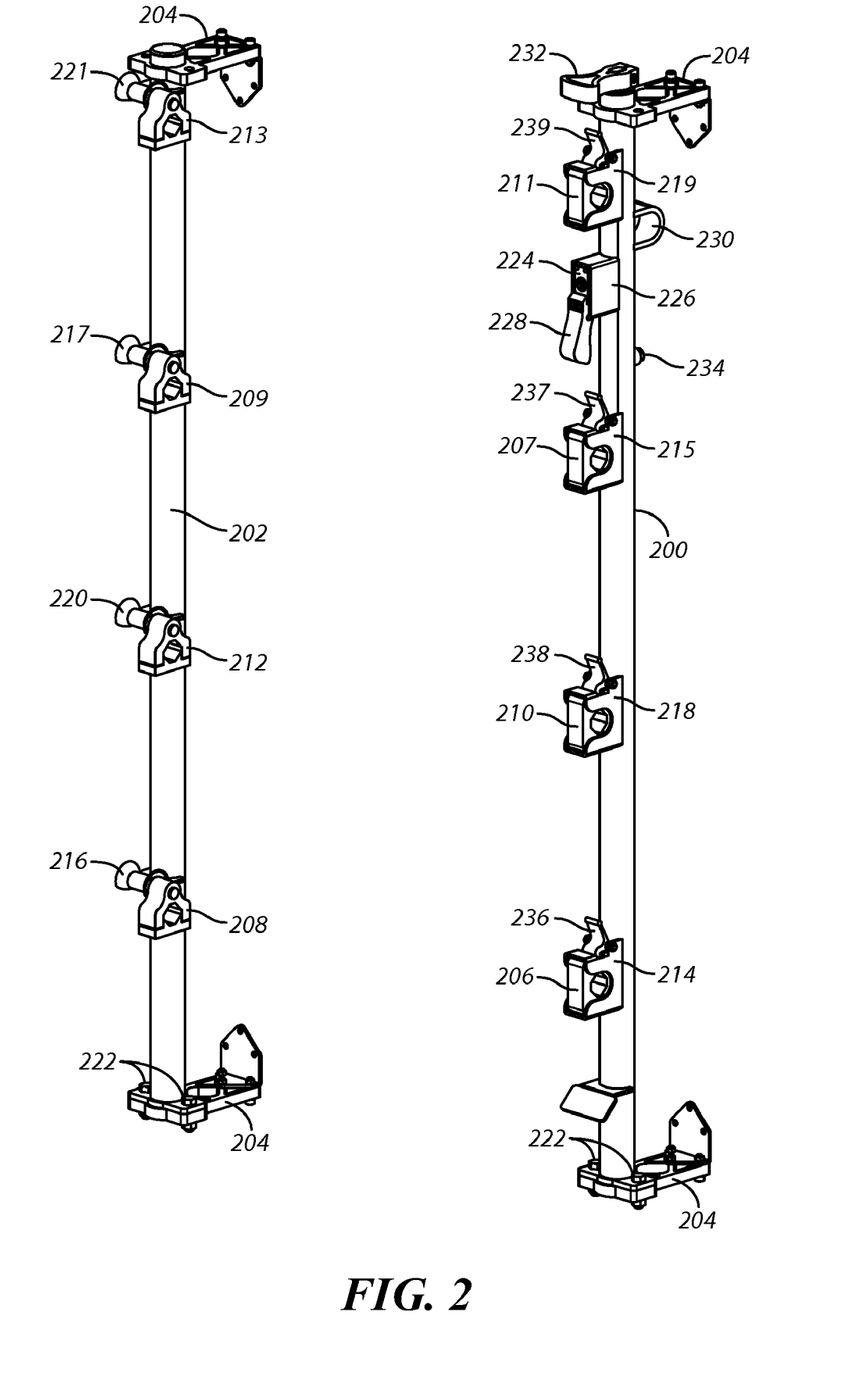
FIG. 2 is a three-dimensional diagram illustrating a four position equipment rack in accordance with one embodiment.

Referring now to FIG. 2, a three-dimensional diagram is shown illustrating a four position equipment rack in accordance with one embodiment. Shown is a first rack shaft 200, a second rack shaft 202, a plurality of trailer brackets 204, a first equipment block 206, a second equipment block 208, a third equipment block 210, a fourth equipment block 212, a fifth equipment block 207, a sixth equipment block 209, a seventh equipment block 211, a eighth equipment block 213, a first locking receiving member 214, a first funnel receiving member 216, a second locking receiving member 218, a second funnel receiving member 220, a third locking receiving member 215, a third funnel receiving member 217, a fourth locking receiving member 219, a fourth funnel receiving member 221, a plurality of securing bolts 222, a lock 224, a lock housing 226, a lock handle 228, a cable securing loop 230, a locking grip 232, a stop bolt 234, a first quick release lever 236, a second quick release lever 238, a third quick release lever 237, and a fourth quick release lever 239.

The equipment rack shown in FIG. 2 is substantially the same as the equipment rack shown in FIG. 1 except for the equipment rack shown in FIG. 2 can hold and additional two pieces of equipment (e.g., two additional trimmers). It should be understood that while the embodiments of FIGS. 1 and 2 show equipment racks that are capable of holding two and four pieces of equipment respectively, other embodiments can hold one or more pieces of equipment. For example, an equipment rack can hold between one and six pieces of equipment. When the equipment rack is designed for a greater number of pieces of equipment (for example, four or more pieces of equipment) the equipment rack will be more stable when mounted using the plurality of trailer brackets (104, 204). However, regardless of the number of pieces of equipment the equipment rack is designed for, the plurality of trailer brackets 204 are still only one exemplary way of mounting the equipment rack.

Referring next to FIG. 3, a three-dimensional diagram is shown illustrating a trimmer shaft coupled to two equipment shaft blocks in accordance with one embodiment. Shown is a shaft 300, a first equipment block 302, a second equipment block 304, a post 306 and a quick release catch 308.

The first equipment block 302 and the second equipment block 304 are securely attached to the shaft 300 such that preferably there is minimal or no rotation between the equipment blocks (also referred to herein as equipment shaft blocks) and the shaft 300. In this manner, the shaft 300 (and thus the piece of equipment) does not rotate when the equipment blocks are attached to the equipment rack (such as is shown in FIGS. 1 and 2). This prevents the equipment from incurring wear on the shaft and also prevents fuel spills and engine flooding. The post 306 is coupled to the second equipment block 304 and engages one of the funnel receiving members shown in FIGS. 1 and 2. This provides a user friendly and versatile means for engaging the second equipment block 304 with the equipment rack and thus, holding the shaft 300 securely on the equipment rack.

The quick release catch 308 engages with one of the quick release levers (136, 138) shown in FIGS. 1 and 2. The quick release lever prevents the equipment block 302 from being removed from one of the locking receiving members (114, 118) of the first rack shaft 100. In this manner, even when the equipment rack is unlocked, the quick release catch prevents the equipment block 302 from accidentally coming free from the equipment rack. Additionally, unlike prior art equipment racks, the quick release catch 308 and quick release levers enable the equipment rack to store and transport equipment when the equipment rack is unlocked. The quick release lever is spring activated such that it normally sits in the latched position and automatically returns to the latched position when released after being pressed toward the first rack shaft 100.

This quick release mechanism is beneficial when driving between work sites during the day because locking the equipment to the rack takes additional time and is unnecessary as the equipment is not going to be unattended. Thus, the quick release lever and quick release catch provides a secondary latching mechanism that provides an easy to use system for securing equipment to the equipment rack while not requiring the equipment to be locked to the equipment rack. FIGS. 1-4 show one type of secondary latching mechanism (i.e., the quick release lever and quick release catch), however, it should be understood that other designs for the secondary latching mechanism are within the scope of the embodiments described herein. Other designs of a secondary latching mechanism are contemplated in alternative embodiments that provide for securely fastening the equipment (e.g., trimmers) to the equipment rack when the equipment rack is in the unlocked position. The secondary latching mechanism allows the equipment to be transported and stored without being locked to the equipment rack. Such functionality is not contemplated or provided by prior equipment racks and provides a significant advantage over the prior equipment racks.

Referring next to FIG. 4, a three-dimensional diagram is shown illustrating the two equipment shaft blocks of FIG. 3 having been disassembled. Shown is a first clamping member 400, a second clamping member 402, a first set of screws 404, a third clamping member 406, a fourth clamping member 408, a second set of screws 410, a post 412, a plurality of gripping portions 414 of the equipment blocks and a locking slot 416.

The first clamping member 400 and the second clamping member 402 are secured about the shaft 300 (shown in FIG. 3) and tightened together using the first set of screws 404. In accordance with one embodiment, when put together, depending upon the size of the shaft, the first clamping member 400 and the second clamping member 402 form an octagon or a hexagon when clamping onto the shaft (see FIG. 5). The contact points on the shaft are the gripping portions 414 of the equipment blocks. Thus, in accordance with the embodiment shown, pressure is applied to the shaft at 4 or more separate pressure points that are evenly distributed about the shaft. This prevents distortion of the shaft when the equipment blocks are securely tightened. When securely fastened, a tight fit is provided between the equipment blocks and the shaft. This feature is more clearly shown below with reference to FIG. 5.

The gripping portions 414 of the equipment blocks allow the equipment blocks to be fastened to shafts having different diameters. For example, in one embodiment, the equipment blocks can be secured to any shaft having a diameter between 0.9 and 1.1 inches. The equipment blocks can also be made for shafts having a larger or smaller diameters by changing the size of the hole formed by the gripping portions 414 of the equipment blocks. In alternative embodiments, the shape of the hole formed by the gripping portions 414 of the equipment blocks can be changed to other shapes that provide greater or fewer contact points with the shaft. So long as the equipment block can be securely attached to the shaft, the number of contact points can vary; however, the design shown in FIGS. 3-5 has proven to provide a very secure fit for shafts having a range of diameters while not deforming the shape of the shaft.

The second clamping member 402 includes the locking slot 416. When the equipment block is placed into one of the locking receiving members that are coupled to the first shaft (such as is shown in FIGS. 1 and 2), the locking slot 416 engages with a portion of an inner tube (shown in FIGS. 8 and 9) referred to herein as a tube latching member 822. The tube latching member 822 engages the equipment block with the inner tube such that the equipment block can not be removed from the equipment rack. This locking mechanism will be described below in greater detail with reference to FIGS. 8 and 9.

Advantageously, the first set of screws 404 are not exposed when the equipment block 302 is positioned within one of the locking receiving members. Thus, the first set of screws can not be removed and therefore, the equipment block can not be removed from the shaft when the equipment is locked in the equipment rack. This prevents theft of the equipment by preventing the removal of the first set of screws 404.

Referring next to FIG. 5, a side view is shown illustrating the trimmer shaft and the equipment shaft block shown in FIGS. 3 and 4. Shown is the shaft 300, the third clamping member 406, the fourth clamping member 408, the post 412 and the plurality of gripping portions 414 of the equipment block.

The plurality of gripping portions 414 contact the shaft 300 in four different places providing four pressure points around the shaft 300. If a shaft having a smaller diameter is used, the fourth clamping member 408 and the third clamping member 406 will be tightened further using the second set of screws 410 (shown in FIG. 4). Having four pressure points puts a relatively even force on the shaft 300 which prevents the shaft 300 from deforming. Additionally, the four pressure points substantially prevents the equipment block from moving in relation to the shaft 300, thus preventing wear and tear on the shaft 300. Thus, the present design prolongs the life of equipment and greatly reduces the wear on shafts that normally would take place during transportation of the equipment.

Figure 6:
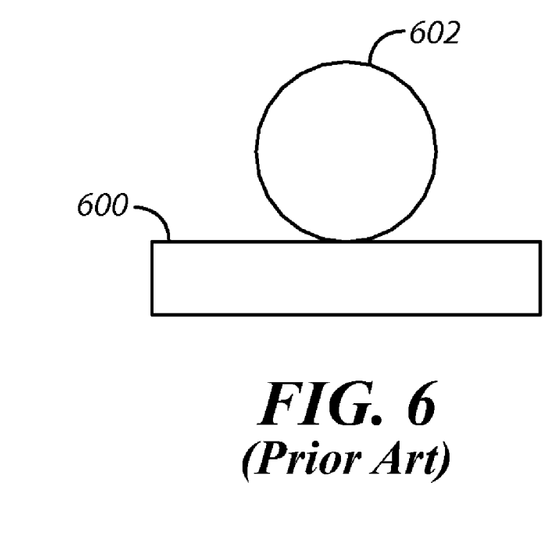
FIG. 6 is a side view illustrating a trimmer support in accordance with a prior equipment rack.

Referring next to FIG. 6, a side view is shown illustrating a trimmer support in accordance with a prior equipment rack. Shown is a shaft 600 and a support 602.

Prior equipment racks generally have a L-shaped portion in which the trimmer rests during transportation. The support 602 illustrates the bottom of the L-shaped portion of the equipment rack. The trimmer sits on the support and during transportation will rattle around and vibrate. This causes a lot of wear on the shaft 600 because all of the weight of the trimmer is supported by one point, thus there is a lot of pressure placed on the shaft 600. This can cause shafts to break during transportation of the trimmer from one location to another. Additionally, because the shaft vibrates, rattles around, and can rotate during transportation, prior racks tend to cause fuel spills and engine flooding.

In contrast, the embodiments described about with reference to FIGS. 1-5 eliminate the wear and tear on the shaft that takes place with equipment racks such as the one shown in FIG. 6. The equipment blocks are securely fastened to the shaft such that there is substantially no movement between the equipment blocks and the shaft during use and during transportation. Thus, there is substantially no wear between the equipment blocks and the shaft. Advantageously, in addition to being a more user friendly equipment rack that has greatly improved security, the present embodiments additionally prevent unnecessary wear and tear to the equipment (e.g., trimmers) during transportation. Further, fuel spills and engine flooding are also greatly reduced or eliminated.

Figure 7:
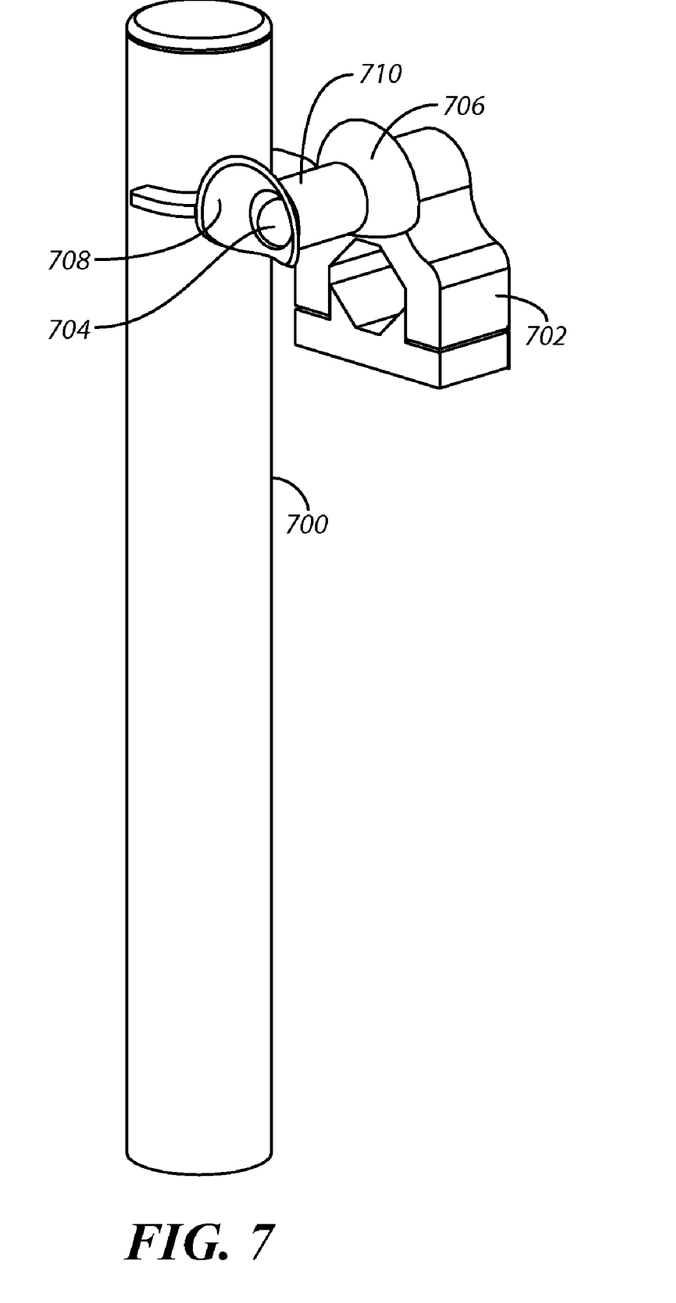
FIG. 7 is a three-dimensional diagram illustrating a portion of the equipment rack shown in FIG. 1 in accordance with one embodiment.

Referring next to FIG. 7, a three-dimensional diagram is shown illustrating a portion of the equipment rack shown in FIG. 1 in accordance with one embodiment. Shown is a rack shaft 700, an equipment block 702, a post 704, and a funnel receiving member 710 including a first funnel 706 and a second funnel 708.

The funnel receiving member 710 is coupled to the rack shaft 700. In accordance with one embodiment, the funnel receiving member 710 is welded to the rack shaft 700. The first funnel 706 and the second funnel 710 are used to guide the post 704 into either side of the funnel receiving member 710. Depending on how the equipment rack is mounted, the post 704 can enter into either side of the funnel receiving member 710. Additionally, the post may enter into either side of the funnel receiving member 710 depending upon how the equipment block is mounted to the equipment. Different users of the system will find it convenient to have the equipment rack and the equipment blocks mounted in various ways. The design of the equipment block 702, the post 704 and the funnel receiving member 710 provide versatility so that the equipment rack can be adapted to different users' preferences.

The funnel receiving member 710 is located on the non-locking side of the equipment rack. The locking side of the rack is the first rack shaft 100 shown in FIG. 1, while the non-locking side of the rack corresponds to the second rack shaft 102 of FIG. 1. Only one side of the equipment rack needs to lock the equipment to the rack in order to prevent theft. Thus, while the equipment block 702, the post 704 and the funnel receiving member 710 are shown in accordance with a preferred embodiment, it should be understood that other support means for the non-locking side of the equipment may be utilized without departing from the benefits of using the equipment block and locking mechanism described with reference to the first support shaft 100 and equipment blocks 106 and 110. That is, an equipment rack utilizing, for example, the locking mechanism that will be described in greater detail with reference to FIGS. 8 and 9 can be implemented using various types of supports that may or may not utilize the equipment block 702, the post 704 and the funnel receiving member 710 shown in FIG. 7. It should be understood, that while such other embodiments can be utilized, the design of the equipment block 702, the post 704 and the funnel receiving member 710 shown in FIG. 7 provides the advantages over the prior support systems that were discussed above.

Figure 8:
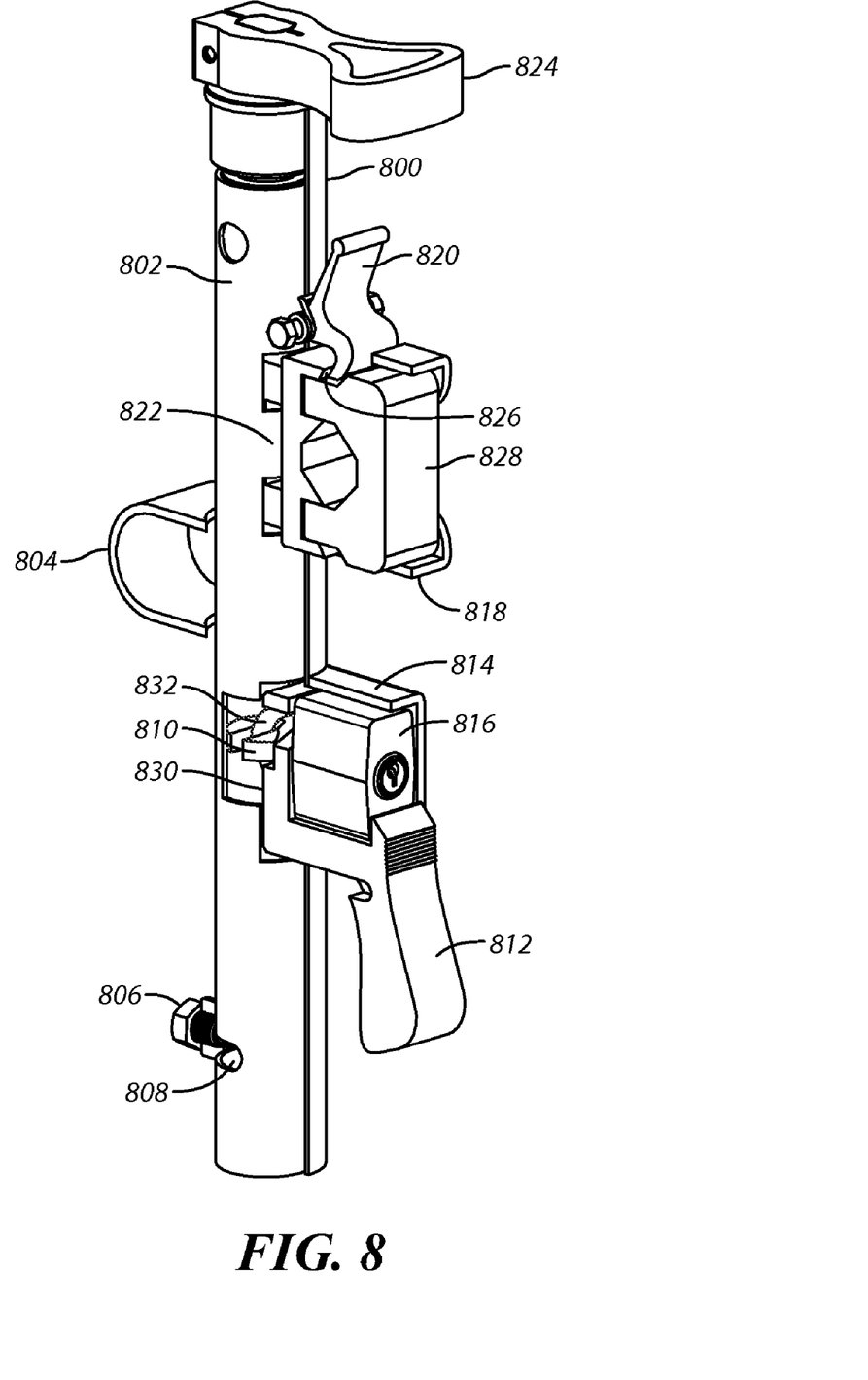
FIG. 8 is a three-dimensional diagram illustrating a locking mechanism of the trimmer shaft shown in FIG. 1 in a locked position in accordance with one embodiment.
Figure 9:
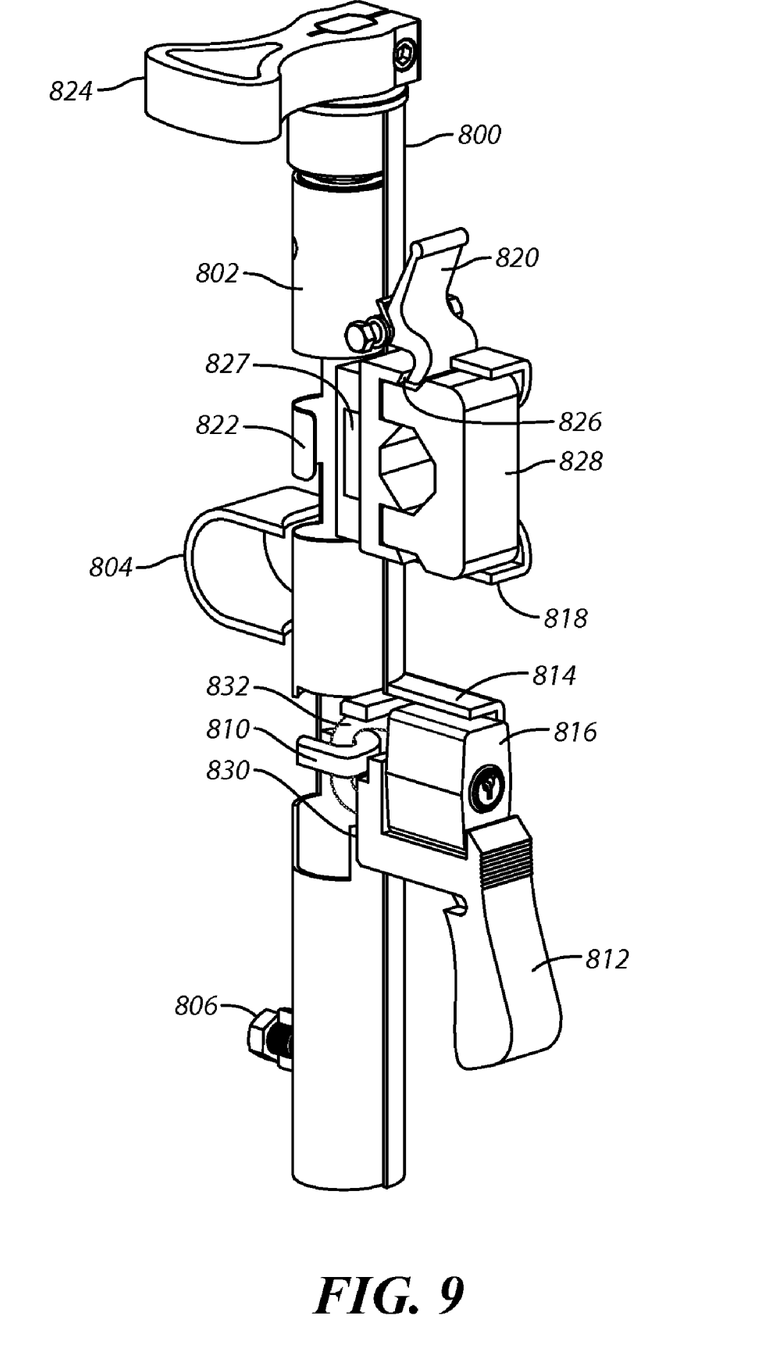
FIG. 9 is a three-dimensional diagram illustrating a locking mechanism of the trimmer shaft shown in FIG. 8 in a unlocked position in accordance with one embodiment.

Referring to FIG. 8, a three-dimensional diagram is shown illustrating a locking mechanism for the trimmer shaft shown in FIG. 1 in a locked position in accordance with one embodiment. Also referring to FIG. 9, a three-dimensional diagram is shown illustrating a locking mechanism for the trimmer shaft shown in FIG. 8 in a unlocked position in accordance with one embodiment. Shown in both FIGS. 8 and 9 are an outer rack support tube 800 and an inner locking tube 802 that form a rack shaft in accordance with one embodiment. Additionally shown is a cable securing loop 804, a stop bolt 806, a stop bolt slot 808 formed on the inner locking tube, a lock retaining member 810, a lock handle 812, a lock housing 814, a lock 816, a locking receiving member 818, a quick release lever 820, a tube latching member 822, a locking grip 824, a quick release catch 826, a locking slot 827, an equipment block 828, an inner portion 830 of the lock handle 812 and a loop portion 832 of the lock 816. The outer rack support tube 800 in FIGS. 8 and 9 is shown partially cut away such that the inner tube and locking functionality can be fully demonstrated. Thus, half of the lock housing 814 and half of the locking receiving member 818 that are welded to the outer rack support tube 800 are also shown partially cut away.

Figure 10:
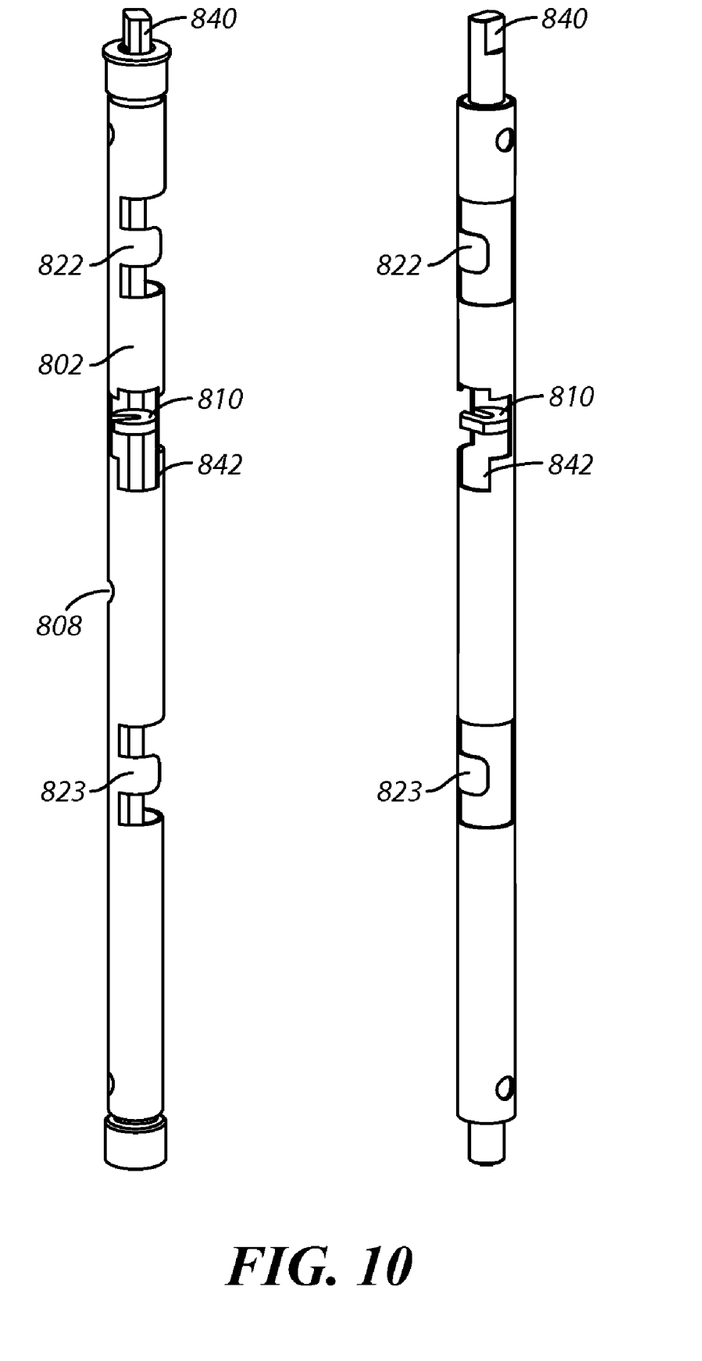
FIG. 10 is a three-dimensional drawing illustrating the inner locking tube shown in FIGS. 9 and 10 in accordance with one embodiment.

The locking grip 824 is coupled to the inner locking tube 802 and is utilized to rotate the inner locking tube 802 when the lock 816 and locking handle 812 are in an unlocked position (such as is shown in FIG. 9). FIG. 8 shows that an inner portion 830 of the lock handle 812 is received by (or engages) a cut away portion 842 of the inner locking tube 802. The cut away portion 842 of the inner locking tube is best shown in FIG. 10. When in the locked position, the inner portion 830 of the lock handle prevents the inner locking tube 802 from rotating.

When in the locked position, the tube latching member 822 slides into the locking slot 827 of the equipment block 828 and prevents the equipment block 828 from being removed from the locking receiving member 818. In operation, a user will insert a key into the lock 816 in order to open the lock 816. Once the lock is open 816, the lock handle 812 and the lock 816 can be moved partially out from the lock housing 814 (shown in FIG. 9). The lock retaining member 810 that is welded to the inside of the inner locking tube 802 prevents the lock 816 and lock handle 812 from being entirely removed from the lock housing 814. When unlocked, the lock handle 812 moves enough so that the inner portion 830 of the lock handle no longer engages the inner locking tube 802 and thus, the inner locking tube 802 is able to rotate in a clockwise direction. As the inner locking tube 802 rotates, the tube latching member 822 slides out of the locking slot 827 of the equipment block 828. Once the inner locking tube has rotated to the position shown in FIG. 9, the equipment block 828 can be removed. At this time a user will press on the quick release lever 820 and slide the equipment block 828 out of the locking receiving member 818.

In the embodiment shown, the stop bolt 806 and the stop bolt slot 808 in the inner locking tube 802 prevent the inner locking tube 802 from rotating more than 90 degrees. The degree of rotation can easily be adjusted by increasing or decreasing the size of the stop bolt slot 808. Additionally, when the stop bolt 806 is removed, the equipment rack is in the unlocked position (i.e., the position shown in FIG. 9), and the equipment blocks are removed, the tube is free to move around 360 degrees in any direction. This makes it possible to insert the lock 816 and lock handle 812 during the initial setup of the equipment rack and also makes it possible to change the lock.

Referring next to FIG. 10, a three-dimensional drawing is shown illustrating the inner locking tube as shown in FIGS. 8 and 9 in accordance with one embodiment. Shown is the inner locking tube 802, the stop bolt slot 808 formed on the inner locking tube 802, the lock retaining member 810, the tube latching member 822, a second tube latching member 823, the cut away portion 842 of the inner locking tube 802, and a locking grip engaging member 840. The inner locking tube 802 in the left side of the figure corresponds to the inner locking tube 802 of FIG. 8 while in a locked position. The inner locking tube 802 in the right side of the figure corresponds to the inner locking tube 802 of FIG. 9 while in an unlocked position.

The inner tube 802 is shown in FIG. 10 such that the operation of the inner tube 802 can be more easily understood. The tube latching member 822 and the second tube latching member 823 will retain the equipment blocks when the equipment rack is locked. The lock retaining member keeps the lock from being removed from the equipment rack while allowing the inner locking tube 802 to be free to rotate.

Figure 11A:
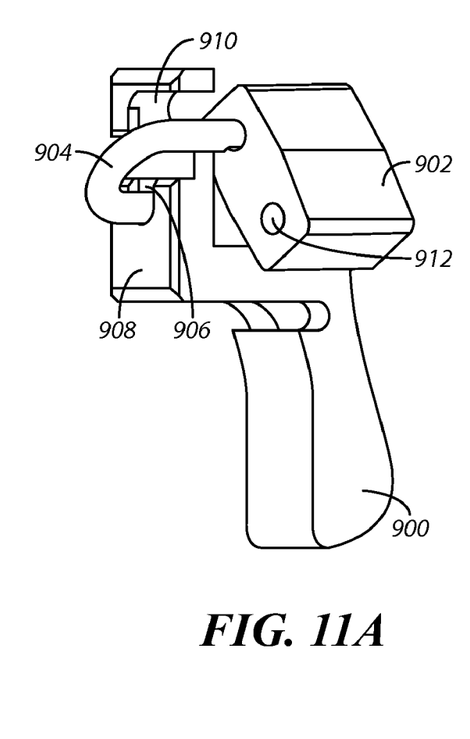
FIGS. 11A-C are a sequence of drawings illustrating inserting a lock into the lock handle of the equipment rack.
Figure 11B:
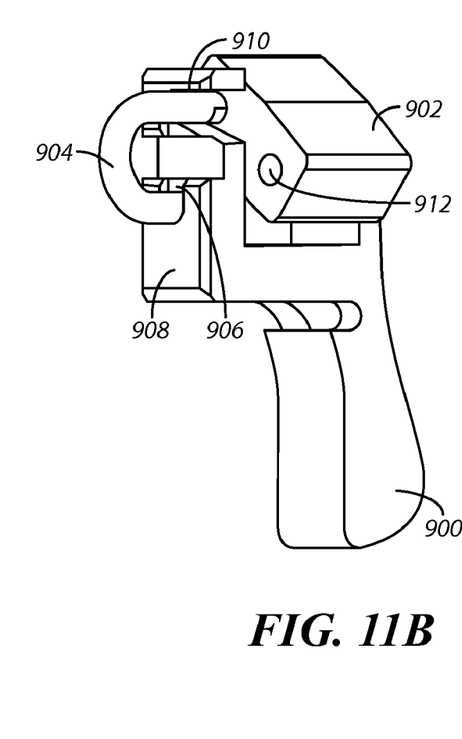
Figure 11C:
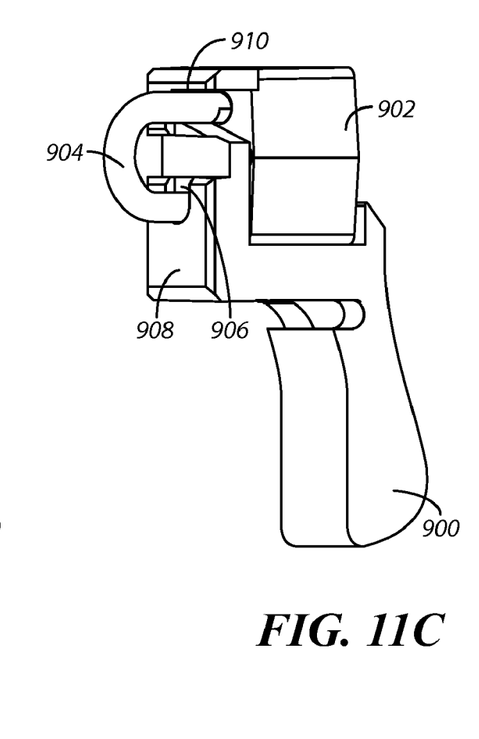

Referring to FIGS. 11A-C, a sequence of drawings is shown illustrating inserting a lock into the handle of the equipment rack. Shown is a lock handle 900, a lock 902, a loop portion 904 of the lock 902, an alignment slot 906 of the lock handle 900, a front portion 908 of the lock handle 900 and a locking hole 912 in the lock 902.

The lock 902 and lock handle 900 provide a locking mechanism, in accordance with one embodiment that can be utilized with many different types of equipment racks and also with many other systems where a locking mechanism is needed or would be beneficial.

A body portion of the lock 902 includes the locking hole 912. The body portion of the lock 902 is coupled to a loop portion 904 of the lock 902. The loop portion 904 of the lock 902 is detachably coupled to the locking hole 912. The general operation of a padlock is very well known in the art.

Generally, in prior systems, when the padlock is in an open position, the loop portion 904 is free to rotate and does not naturally line up with the locking hole 912 of the lock. A user of the lock, when wanting to close the lock, will align the loop portion 904 with the locking hole 912 and press the loop portion 904 into the locking hole 912. However, this assumes that the lock and the loop portion are fully accessible by the user. When a lock is fully accessible, the lock will also be very susceptible to thieves who can easily remove the lock with a set of bolt cutters.

The present embodiment discloses a locking system that makes the lock 902 much less susceptible to thieves while allowing for the lock to be easily locked and unlocked as needed. The lock 902 is positioned into the handle 900 as demonstrated in FIGS. 11A-C. The lock 902 is in an unlocked position during the entire sequence of drawings. Once in place, the lock 902 and the handle 900 are positioned into the lock housing 126 (shown, for example, in FIG. 1). As is shown in FIG. 11C, while the lock is in the unlocked position, the alignment slot 906 in the front portion 908 of the lock handle 900 keeps the loop portion 904 of the lock aligned with the locking hole 912. Additionally, the housing 126 keeps the body of the lock 902 from rotating, and thus, also keeps the locking hole 912 aligned with the loop portion 904 of the lock. In this manner, the lock 902 can easily be locked and unlocked as shown in FIGS. 8 and 9, while also being protected by the lock housing 126. This system is a vast improvement over a lock that is exposed, such as is used in many prior equipment rack systems.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

I claim:

1. An equipment rack system comprising:
an outer rack support tube;
a first receiving member coupled to the outer support tube;
an inner locking tube positioned within the outer support tube, the inner locking tube including a first tube latching member;
a first equipment shaft block adapted to fit with the first receiving member, the first equipment shaft block including a latching slot that engages with the first tube latching member when the inner locking tube is in a locked position;
a second receiving member coupled to the outer support tube;
a second tube latching member of the inner locking tube;
a second equipment shaft block adapted to fit with the second receiving member, the second equipment shaft block including a latching slot that engages with the second tube latching member when the inner locking tube is in a locked position;
a lock housing coupled to the outer support tube;
a lock substantially positioned within the lock housing when the lock is in a locked position; and
a lock handle, coupled to the lock and partially positioned within the lock housing;
wherein the outer rack support tube and the inner locking tube form a first rack shaft and wherein the equipment rack system further comprises:
a second rack shaft; and
a support mechanism coupled to the second rack shaft;
wherein the support mechanism coupled to the second rack shaft comprises:
a first funnel receiving member;
a second funnel receiving member;
a third equipment shaft block including a post that engages with the first funnel receiving member; and
a fourth equipment shaft block including a post that engages with the second funnel receiving member.

2. The equipment rack system of claim 1 further comprising a locking grip coupled to the inner locking tube and used to rotate the inner locking tube.

3. The equipment rack system of claim 1 further comprising a secondary latching mechanism that prevents the equipment shaft block from disengaging from the receiving member when the inner locking tube is in an unlocked position.

4. The equipment rack system of claim 3 wherein the secondary latching mechanism includes a quick release lever.

5. An equipment rack system comprising:
an outer rack support tube;
a first receiving member coupled to the outer support tube;
an inner locking tube positioned within the outer support tube, the inner locking tube including a first tube latching member; and
a first equipment shaft block adapted to fit with the first receiving member, the first equipment shaft block including a latching slot that engages with the first tube latching member when the inner locking tube is in a locked position, wherein the outer rack support tube and the inner locking tube form a first rack shaft and wherein the equipment rack system further comprises:
a second rack shaft; and
a support mechanism coupled to the second rack shaft,
wherein the support mechanism coupled to the second rack shaft comprises:
a funnel receiving member; and
an equipment shaft block including a post that engages with the funnel receiving member.

6. An equipment rack system comprising:
an outer rack support tube;
a first receiving member coupled to the outer support tube;
an inner locking tube positioned within the outer support tube, the inner locking tube including a first tube latching member; and
a first equipment shaft block adapted to fit with the first receiving member, the first equipment shaft block including a latching slot that engages with the first tube latching member when the inner locking tube is in a locked position, wherein the inner locking tube is entirely enclosed by the outer rack support tube.

7. An equipment rack system comprising:
a first equipment shaft block adapted to attach to a first shaft;
a rack support structure including a locking mechanism; and
a first locking receiving member coupled to the rack support structure, the first locking receiving member adapted to receive the first equipment shaft block such that the locking mechanism can engage the first equipment shaft block;
an outer rack support tube;
an inner locking tube positioned within the outer support tube, the inner locking tube including a first tube latching member, wherein the first tube latching member engages with a locking slot in the first equipment shaft block when the inner locking tube is in a locked position;
a second equipment shaft block adapted to attach to a second shaft;
a second locking receiving member coupled to the rack support structure; and
wherein the inner locking tube further includes a second tube latching member that engages with a locking slot in the second equipment shaft block when the inner locking tube is in the locked position;
a lock housing coupled to the outer support tube;
a lock substantially positioned within the lock housing when the lock is in a locked position; and
a lock handle, coupled to the lock and partially positioned within the lock housing;
wherein the outer rack support tube and the inner locking tube form a first rack shaft and wherein the equipment rack system further comprises:
a second rack shaft; and
a support mechanism coupled to the second rack shaft;
wherein the support mechanism coupled to the second rack shaft comprises:
a first funnel receiving member;
a second funnel receiving member;
a third equipment shaft block including a post that engages with the first funnel receiving member; and
a fourth equipment shaft block including a post that engages with the second funnel receiving member.

* * * * *